United States Patent
Rhoades et al.

(10) Patent No.: US 8,925,706 B2
(45) Date of Patent: Jan. 6, 2015

(54) VEHICLE PARKING BRAKE CONTROL LEVER AND PIN WITH ROLLERS

(71) Applicant: Dana Automotive Systems Group, LLC, Maumee, OH (US)

(72) Inventors: Douglas R. Rhoades, Fremont, OH (US); Linda S. Gulvas, Graytown, OH (US); Jason M. Sidders, Milan, MI (US); Paul V. Mackalski, Milford, MI (US)

(73) Assignee: Dana Automotive Systems Group, Inc., Maumee, OH (US)

( * ) Notice: Subject to any disclaimer, the term of this patent is extended or adjusted under 35 U.S.C. 154(b) by 0 days.

(21) Appl. No.: 14/033,779

(22) Filed: Sep. 23, 2013

(65) Prior Publication Data

US 2014/0083238 A1 Mar. 27, 2014

Related U.S. Application Data

(60) Provisional application No. 61/705,806, filed on Sep. 26, 2012.

(51) Int. Cl.
| | |
|---|---|
| *F16H 63/34* | (2006.01) |
| *B60T 1/06* | (2006.01) |
| *B60T 7/02* | (2006.01) |
| *B60T 1/00* | (2006.01) |

(52) U.S. Cl.
CPC . *B60T 7/02* (2013.01); *B60T 1/005* (2013.01); *F16H 63/3416* (2013.01)
USPC .............................. 192/219.5; 188/69; 188/31

(58) Field of Classification Search
CPC ...... F16H 63/3416; F60T 1/005; B60T 1/005; B60T 1/02
USPC .................... 192/219.5; 188/31, 69; 74/411.5
See application file for complete search history.

(56) References Cited

U.S. PATENT DOCUMENTS

| | | | |
|---|---|---|---|
| 3,273,418 | A | 9/1966 | Ellis |
| 3,316,776 | A | 5/1967 | Schroter |

(Continued)

FOREIGN PATENT DOCUMENTS

| | | |
|---|---|---|
| DE | 10144056 A1 | 3/2003 |
| DE | 10144063 A1 | 3/2003 |

(Continued)

OTHER PUBLICATIONS

Dana, Prior Lever + Pin without Rollers Drawing, 1 sheet, Sep. 12, 2012.

*Primary Examiner* — Troy Chambers
*Assistant Examiner* — Lillian Nguyen
(74) *Attorney, Agent, or Firm* — Marshall & Melhorn, LLC

(57) ABSTRACT

A vehicle parking brake control has an extendable pin with three faces, and a roller on a lower surface. The faces correspond to engage, hold, and disengage of a parking brake. The control also has a lever rotatably connected to it, where the lever has a roller at a lower lever surface. The roller being capable of rotational contact with the pin faces. Further, the control has a base with an upper surface for the pin roller to move across. When the parking brake is engaged the lever roller is in contact with a first face, when the brake is on hold the lever roller is in contact with a second face, and when the brake is in the disengage position the lever roller is in contact with a third face of the extendable pin. Consequently, the rollers provide a reliable lifelong operation of the control over prior controls.

12 Claims, 2 Drawing Sheets

(56) References Cited

U.S. PATENT DOCUMENTS

| | | |
|---|---|---|
| 3,601,231 A | 8/1971 | Kolacz |
| 3,647,031 A | 3/1972 | Burnett |
| 3,690,416 A | 9/1972 | Yamada |
| 3,780,599 A | 12/1973 | Schaefer |
| 4,290,507 A | 9/1981 | Brown |
| 4,606,242 A * | 8/1986 | Hasegawa et al. .......... 74/606 R |
| 5,528,956 A | 6/1996 | Harger |
| 5,685,406 A * | 11/1997 | Crum et al. ................ 192/219.5 |
| 5,832,784 A | 11/1998 | McCallips |
| 6,131,483 A | 10/2000 | Kuller |
| 6,588,294 B1 * | 7/2003 | Rogg ........................ 74/473.21 |
| 6,705,436 B2 | 3/2004 | Noll |
| 2002/0092710 A1 * | 7/2002 | Oppitz et al. ................... 188/69 |
| 2009/0173584 A1 * | 7/2009 | Reichert ........................ 188/31 |
| 2009/0314604 A1 * | 12/2009 | Reichert ..................... 192/219.5 |
| 2012/0279823 A1 * | 11/2012 | Reichert et al. ............ 192/219.5 |

FOREIGN PATENT DOCUMENTS

| | | |
|---|---|---|
| EP | 162749 A1 | 11/1985 |
| GB | 943622 A | 12/1963 |
| JP | 60139557 A | 7/1985 |
| JP | 7-9960 A | 1/1995 |
| WO | 2009-047520 A2 | 4/2009 |

* cited by examiner

US 8,925,706 B2

VEHICLE PARKING BRAKE CONTROL LEVER AND PIN WITH ROLLERS

RELATED APPLICATION

This application claims the benefit under 35 U.S.C. §119 (e) of U.S. Provisional Patent Application Ser. No. 61/705,806, filed Sep. 26, 2012, which is incorporated by reference herein in its entirety.

FIELD OF THE INVENTION

The present invention relates to a vehicle parking brake control lever and pin. More particularly, the present invention relates to a vehicle parking brake control lever and pin that are utilized to engage, hold, and disengage a vehicle parking brake.

BACKGROUND OF THE INVENTION

As illustrated in prior art FIGS. 1 and 2, a vehicle parking brake control 10 has a vehicle parking brake control pin 11 that is capable of lifting a vehicle parking brake control lever 12 into an engaged gear position, maintaining the control lever 12 in a hold position (engaged while allowing easy release thereof), and releasing the control lever 12 from the engaged gear position (disengaged), thereby controlling a vehicle parking brake (not shown but common in the art).

Functionally, a control lever ramp 14 of the control lever 12 rests on a slanted middle face 16 of the control pin 11, wherein the control lever 12 positions the vehicle parking brake in a hold position H1. If the control pin 11 is caused to be extended to position E1, from the hold position H1, the control lever 12 subsequently is caused to rotate about pivot P1 in a clockwise manner per the view of FIG. 1, which causes the control lever ramp 14 of the control lever 12 to be lifted up. Hence, the vehicle parking brake is placed into an engaged gear position and the control lever ramp 14 slides on an upper face 18 of the control pin 11.

If on the other hand, the control pin 11 is retracted to position R1, from the hold position H1, the control lever 12 subsequently rotates about pivot P1, in a counterclockwise manner as viewed in FIG. 1, which causes the control lever ramp 14 to be lowered, whereby the vehicle parking brake is released from the engaged gear position and the control lever ramp 14 slides down a lower face 20 of the control pin 11.

In addition to the movement of the control lever ramp 14 on the control pin 11 between the faces 16, 18, 20, a bottom surface 22 of the control pin 11 experiences back and forth lateral movement over a top surface 24 of a base 26, which is taken to be stationary with respect to the movement of the control pin 11 and the control lever 12.

FIG. 2 further illustrates a control spring 28 that can be compressed or decompressed by a motor driven actuator piston 29, which is what causes the bottom surface 22 of the control pin 11 to move back and forth (i.e., engage, hold, and disengage) across the top surface 24 of the base 26.

Unfortunately, throughout the functional life of the above-described prior art parking brake items 11, 12, 26, the faces/surfaces 14, 16, 18, 20, 22, 24 are exposed to debris and "wear and tear" that cause the coefficient of friction at those faces/surfaces 14, 16, 18, 20, 22, 24 to increase at different rates throughout the life of a vehicle (not shown). As a result, the parking brake control pin 11, lever 12, and base 26 gradually become unbalanced and prematurely fail to operate as intended.

Consequently, it would be beneficial to provide a means within a parking brake control of a control pin, lever, and base that would not fail prematurely due to differences in friction between the control pin, lever, and base. This means must provide more consistent coefficients of friction on mating parts and must not increase material or labor costs.

SUMMARY OF THE INVENTION

A vehicle parking brake control comprises an extendable control pin having first, second, and third faces, with a roller rotating on its own shaft that is rotatably connected at a lower extendable control pin surface. The three control pin faces respectively correspond to engage, hold, and disengage (aka, release) positions of a vehicle parking brake. Also, there is a control lever rotatably connected to the vehicle parking brake control, where the control lever has a roller, rotating on its own shaft, rotatably disposed at a lower control lever face, and where the control lever roller is capable of separate rotational motion contact with the three control pin faces. Further, the vehicle parking brake control comprises a control base having an upper surface that cooperates with the control pin roller for lateral rotational motion of the control pin roller.

Consequently, when the vehicle parking brake control is in the engage position the control lever roller is in physical contact with the first face of the extendable control pin, when the vehicle parking brake control is in the hold position the control lever roller is in physical contact with the second face of the extendable control pin, and when the vehicle parking brake control is in the disengage position the control lever roller is in physical contact with the third face of the extendable control pin.

As a result of the control lever roller being in rotational physical contact with the three faces of the extendable control pin, and the control pin roller being in rotational lateral motion with the upper surface of the control base, the vehicle parking brake control does not fail prematurely due to frictional differences between the control pin and lever and between the control pin and base. It has been found that these results are due in part to the coefficients of friction on mating parts remaining consistent over time, wherein lower material or labor costs and greater reliability of the system are realized.

Further objects and advantages of the present invention will be apparent from the following description and appended claims, reference being made to the accompanying drawings forming a part of a specification, wherein like reference characters designate corresponding parts of several views.

DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 3:
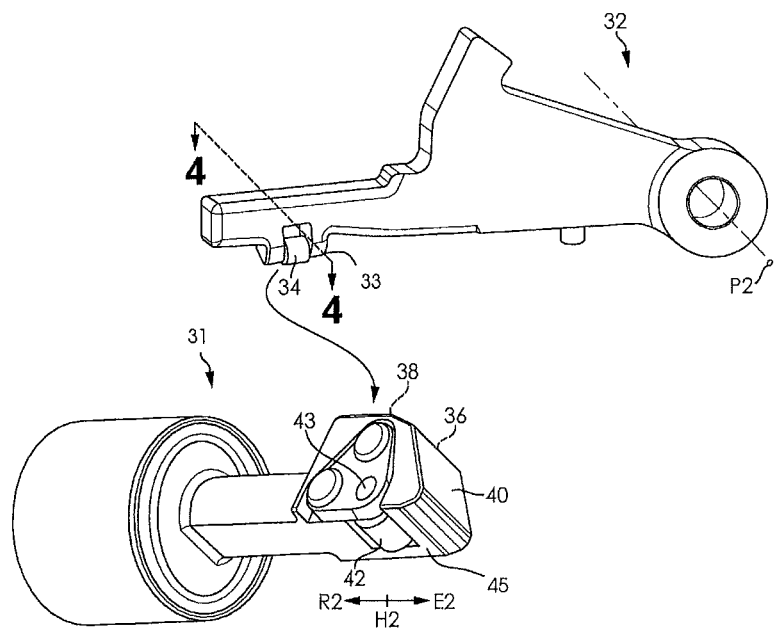
FIG. 3 is a perspective view of an extendable brake control pin and lever in accordance with the present invention.
Figure 4:
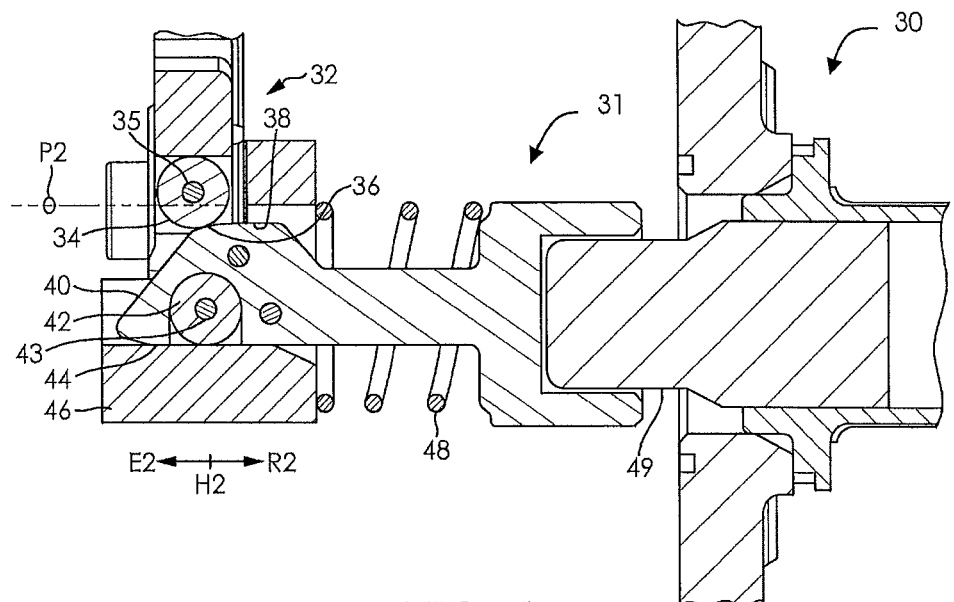
FIG. 4 is a cross sectional plan view of the extendable brake control pin and lever along the lines 4-4 of FIG. 3.

As illustrated in FIGS. 3 and 4, a vehicle parking brake control 30 is comprised of a vehicle parking brake control pin 31 that is capable of lifting a vehicle parking brake control lever 32 into an engaged gear position, maintaining the control lever 32 in a hold position (engaged while allowing easy release thereof), or releasing the control lever 32 from the engaged gear position (disengaged), thereby controlling a vehicle parking brake (not shown but common in the art).

Functionally, a control lever roller 34, rotating on a lever shaft 35 of the control lever 32, is indicated in FIGS. 3 and 4 as resting on a slightly slanted middle face 36 of the control pin 31, wherein the control lever 32 positions the vehicle parking brake in a hold position H2. The control lever roller 34 is rotatably connected just above a lower control lever surface 33 of the control lever 32. As such, if the control pin 31 is caused to be extended to position E2, from the hold position H2, the control lever 32 subsequently is caused to rotate about pivot P2 in a clockwise manner per the view of FIG. 3, which causes the lever roller 34 of the control lever 32 to be lifted up. Hence, the vehicle parking brake is placed into an engaged gear position and the lever roller 34 rolls on a relatively flat upper face 38 of the control pin 31.

If on the other hand, the control pin 31 is caused to be retracted to position R2, from the hold position H2, the control lever 32 subsequently rotates about pivot P2, in a counterclockwise manner as shown in FIG. 3, which causes the lever roller 34 of the control lever 32 to be lowered, whereby the vehicle parking brake is released from the engaged gear position and the lever roller 34 rolls down a slanted lower face 40 of the control pin 31.

In addition to the movement of the control lever roller 34 on the control pin 31 between the faces 36, 38, 40, a pin roller 42, rotating on a pin shaft 43 of the control pin 31, experiences back and forth lateral rolling movement over a top surface 44 of a base 46 that is taken to be stationary with respect to the movements of the control pin 31 and the control lever 32. The control pin roller 42 is rotatably connected just above a lower control pin surface 45 of the control pin 31.

FIG. 4 further illustrates a control spring 48 that is in mechanical compressive or decompressive communication with a motor driven actuator piston 49, which causes the control pin roller 42 to move back and forth (i.e., during engage, hold, and disengage) across the top surface 44 of the base 46, throughout the lateral rotational motion of the extendable control pin roller 42.

It is notable that the various terminology associated with the three positions of the extendable control pin 31 and the control lever 32 are: a) when the extendable control pin 31 is in the extended position E2, where the extendable control pin roller 42 is extended past the control lever roller 34, the extendable control pin 31 has lifted the control lever 32 up into the relatively flat engage position face 38 and puts the vehicle park brake into an engaged gear position, b) when the extendable control pin 31 is in the middle position H2, where the extendable control pin roller 42 is positioned directly below the control lever roller 34, the extendable control pin 42 has lifted the control lever 32 up into the slightly slanted face 36 and puts the vehicle park brake into the hold position, and c) when the extendable control pin 31 is in the retracted position R2, where the extendable control pin roller 42 is positioned inward the control lever roller 34, the extendable control pin 42 lowers the control lever 32 on the slanted face 40 (i.e., release position) and puts the vehicle park brake into a disengaged gear position.

Figure 1:
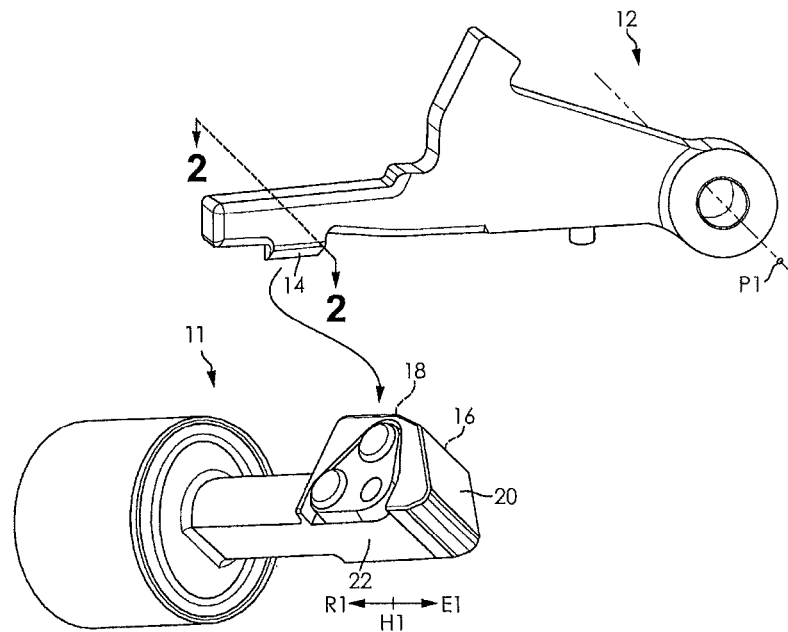
FIG. 1 is a perspective view of a prior art extendable brake control pin and lever.
Figure 2:
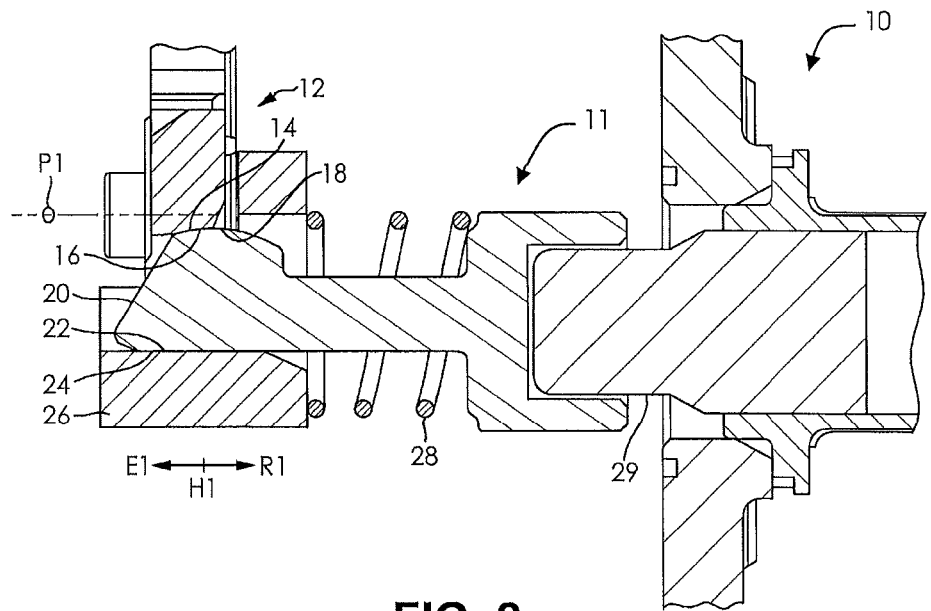
FIG. 2 is a cross sectional plan view of the prior art extendable brake control pin and lever along the lines 2-2 of FIG. 1.

Therefore, even though the faces/surfaces 36, 38, 40, 44 are exposed to debris and wear and tear that could cause the coefficients of friction to increase throughout the life of a vehicle, the faces/surfaces 36, 38, 40, 44 do not wear down like those of the prior art shown in FIGS. 1 and 2. This is due to the control rollers 34, 42 providing a consistent coefficient of friction on mating parts. Consequently, material or labor costs are lower compared to the prior art.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A vehicle parking brake control, comprising:
   an extendable control pin having first, second, and third faces, and an extendable control pin roller rotatably connected just above a lower control pin surface, the control pin faces corresponding to engage, hold, and disengage positions for a vehicle parking brake;
   a control lever rotatably connected at a first end to the vehicle parking brake and having a control lever roller rotatably connected just above a lower control lever surface at a second end, the control lever roller capable of separate rotational motion contact with the three upper control pin faces at the second end; and
   a control base having an upper surface that cooperates with lateral rotational motion of the control pin roller;
   wherein when the vehicle parking brake is in the engage position the control lever roller is in physical contact with the first face of the extendable control pin, when the vehicle parking brake is in the hold position the control lever roller is in physical contact with the second face of the extendable control pin, and when the vehicle parking brake is in the disengage position the control lever roller is in physical contact with the third face of the extendable control pin.

2. The vehicle parking brake control of claim 1, wherein the extendable control pin roller is positioned directly below the control lever roller when the vehicle park brake is in the hold position.

3. The vehicle parking brake control of claim 1, wherein the extendable control pin roller is in an extended position past the control lever roller when the vehicle park brake is in the engage position.

4. The vehicle parking brake control of claim 1, wherein the extendable control pin roller is in a retracted position inward of the control lever roller when the vehicle park brake is in the disengage position.

5. The vehicle parking brake control of claim 1, wherein the extendable control pin roller remains in roller contact with the upper surface of the control base throughout the lateral rotational motion of the extendable control pin roller.

6. The vehicle parking brake control of claim 5, further comprising a control spring in compressive or decompressive communication with a motor driven actuator piston for lateral rotational motion of the extendable control pin roller on the top surface of the control base.

7. A method of controlling a vehicle parking brake, comprising:
   providing an extendable control pin having first, second, and third upper faces at an end thereof, and an extendable control pin roller rotatably connected just above a lower extendable control pin surface at that end of the extendable control pin;

providing a control lever rotatably connected to a vehicle parking brake at a first end and having a roller rotatably connected just above a lower control lever surface at a second end, the control lever roller capable of separately rolling on the three extendable control pin faces;

providing a control base having an upper surface whereupon the control pin roller rolls; and extending and retracting the extendable control pin roller over the upper surface of the control base;

thereby rotating the control lever about a pivot at the control lever first end and raising and lowering the control lever at the second end, so as to allow the control lever roller to roll across the control pin faces that correspond to engaging, holding, and disengaging positions for the vehicle parking brake.

8. The method of controlling a vehicle parking brake of claim 7, further comprising positioning the extendable control pin roller directly below the control lever roller when the vehicle park brake is in the holding position.

9. The method of controlling a vehicle parking brake of claim 7, further comprising extending the control pin roller past the control lever roller when the vehicle park brake is in the engaging position.

10. The method of controlling a vehicle parking brake of claim 7, further comprising retracting the control pin roller inward of the control lever roller when the vehicle park brake is in the disengaging position.

11. The method of controlling a vehicle parking brake of claim 7, further comprising rolling the control pin roller over the upper surface of the control base throughout the lateral rotational motion of the extendable control pin.

12. The method of controlling a vehicle parking brake of claim 11, further comprising compressing or decompressing a control spring with a motor driven actuator piston, thereby laterally rotating the extendable control pin roller on the top surface of the control base, thereby providing consistent coefficients of friction on mating parts over time.

\* \* \* \* \*